United States Patent
Choi et al.

(10) Patent No.: US 10,168,740 B2
(45) Date of Patent: Jan. 1, 2019

(54) FLEXIBLE WINDOW SUBSTRATE AND FLEXIBLE DISPLAY DEVICE HAVING THE SAME

(71) Applicant: Samsung Display Co., Ltd., Yongin-si, Gyeonggi-do (KR)

(72) Inventors: Min-Hoon Choi, Seoul (KR); Sang-Il Park, Yongin-si (KR); Hyun Joon Oh, Seongnam-si (KR); Hye-Jin Oh, Asan-si (KR); Jeoung Sub Lee, Seoul (KR); In Sun Hwang, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 220 days.

(21) Appl. No.: 14/868,220

(22) Filed: Sep. 28, 2015

(65) Prior Publication Data

US 2016/0224068 A1    Aug. 4, 2016

(30) Foreign Application Priority Data

Jan. 30, 2015    (KR) ........................ 10-2015-0015565

(51) Int. Cl.
*G06F 1/16* (2006.01)
*G06F 3/041* (2006.01)
*G09F 9/30* (2006.01)

(52) U.S. Cl.
CPC ............ *G06F 1/1652* (2013.01); *G06F 3/041* (2013.01); *G06F 3/0412* (2013.01); *G09F 9/301* (2013.01);
(Continued)

(58) Field of Classification Search
CPC ......... G06F 1/1652; G06F 2203/04102; G06F 2203/04103; G06F 3/041; G06F 3/0412; G09F 9/301
(Continued)

(56) References Cited

U.S. PATENT DOCUMENTS 5,988,503 A   11/1999  Kuo
6,403,223 B1   6/2002  Albro et al.
(Continued)

FOREIGN PATENT DOCUMENTS

JP   2002-94203 A    3/2002
JP   2004-196008 A   7/2004
(Continued)

OTHER PUBLICATIONS

EPO Search Report dated Jun. 17, 2016 of the corresponding EP Patent Application No. 16150398.2, (8 pages).
(Continued)

*Primary Examiner* — Tony Davis
(74) *Attorney, Agent, or Firm* — Lewis Roca Rothgerber Christie LLP

(57) ABSTRACT

A flexible display device including a display panel configured to display an image, a touch screen panel on the display panel, and a window substrate covering the touch screen panel. The window substrate includes: a flexible base layer including a first surface facing an outside and a second surface facing the display panel in an opposite direction to the first surface; a first coating layer having hardness higher than that of the base layer and having a plurality of first coating tiles arranged on the first surface of the base layer thereof, at a first gap from each other; and a second coating layer having hardness higher than that of the base layer and having a plurality of second coating tiles arranged on a layer different from the first surface of the base layer thereof, at a second gap from each other.

36 Claims, 10 Drawing Sheets

(52) U.S. Cl.
CPC ............ *G06F 2203/04102* (2013.01); *G06F 2203/04103* (2013.01)

(58) Field of Classification Search
USPC ........................................ 345/170–176, 211
See application file for complete search history.

(56) References Cited

U.S. PATENT DOCUMENTS

| | | |
|---|---|---|
| 8,025,958 B2 | 9/2011 | Yamamoto et al. |
| 8,199,471 B2 | 6/2012 | Bemelmans et al. |
| 8,223,130 B2 | 7/2012 | Takashima et al. |
| 9,213,929 B2 | 12/2015 | Tazaki et al. |
| 9,411,377 B2 | 8/2016 | Park et al. |
| 9,519,083 B2 | 12/2016 | Park et al. |
| 9,619,059 B2 | 4/2017 | Park et al. |
| 2003/0060569 A1 | 3/2003 | White et al. |
| 2005/0053768 A1 | 3/2005 | Friedman et al. |
| 2005/0212547 A1 | 9/2005 | Suzuki |
| 2007/0052670 A1 | 3/2007 | Lee et al. |
| 2007/0252825 A1* | 11/2007 | Nashiki ................. G06F 3/045 345/173 |
| 2009/0004478 A1 | 1/2009 | Baetzold et al. |
| 2009/0247694 A1 | 10/2009 | Kritzer et al. |
| 2010/0026662 A1 | 2/2010 | Oohira |
| 2010/0162824 A1 | 7/2010 | Jamshidi et al. |
| 2010/0201603 A1 | 8/2010 | Kee et al. |
| 2010/0309160 A1 | 12/2010 | Lin |
| 2011/0025640 A1 | 2/2011 | Lin et al. |
| 2011/0032704 A1 | 2/2011 | Oh et al. |
| 2011/0241051 A1 | 10/2011 | Carter et al. |
| 2011/0248938 A1 | 10/2011 | Kwak et al. |
| 2011/0304578 A1 | 12/2011 | Kim et al. |
| 2012/0014082 A1 | 1/2012 | Naksen |
| 2012/0081331 A1 | 4/2012 | Chae et al. |
| 2012/0138970 A1 | 6/2012 | Shim et al. |
| 2012/0147599 A1 | 6/2012 | Shim et al. |
| 2012/0192466 A1 | 8/2012 | Kee et al. |
| 2013/0002569 A1* | 1/2013 | Kang ..................... G06F 3/044 345/173 |
| 2013/0034685 A1 | 2/2013 | An et al. |
| 2013/0177748 A1 | 7/2013 | Hirai et al. |
| 2013/0208196 A1 | 8/2013 | Kim et al. |
| 2013/0300678 A1 | 11/2013 | Kang et al. |
| 2014/0198266 A1 | 7/2014 | Park et al. |
| 2014/0218408 A1 | 8/2014 | Kwon et al. |
| 2014/0253826 A1 | 9/2014 | He |
| 2015/0062456 A1 | 3/2015 | Miyazaki et al. |
| 2015/0192986 A1 | 7/2015 | Yang |
| 2015/0212547 A1 | 7/2015 | Park et al. |
| 2016/0077553 A1 | 3/2016 | Hyun |
| 2016/0124536 A1 | 5/2016 | Hyun et al. |
| 2016/0188098 A1 | 6/2016 | Her et al. |
| 2016/0221294 A1* | 8/2016 | Choi ..................... B32B 5/142 |
| 2016/0224068 A1* | 8/2016 | Choi ..................... G06F 1/1652 |
| 2016/0320803 A1* | 11/2016 | Oh ........................ G06F 1/1652 |
| 2018/0024592 A1* | 1/2018 | Lim ...................... G06F 1/1652 |

FOREIGN PATENT DOCUMENTS

| | | |
|---|---|---|
| JP | 5008049 B2 | 8/2012 |
| JP | 2012-252224 A | 12/2012 |
| JP | 2013-45823 A | 3/2013 |
| KR | 10-0550377 | 2/2006 |
| KR | 10-2006-0114443 | 11/2006 |
| KR | 10-2007-0003295 | 1/2007 |
| KR | 10-2007-0094184 | 9/2007 |
| KR | 10-2008-0062355 | 7/2008 |
| KR | 10-2008-0088767 A | 10/2008 |
| KR | 10-2010-0077799 A | 7/2010 |
| KR | 10-2010-0135089 | 12/2010 |
| KR | 10-2011-0062523 | 6/2011 |
| KR | 10-2011-0105751 | 9/2011 |
| KR | 10-2011-0128533 | 11/2011 |
| KR | 10-1113661 | 2/2012 |
| KR | 10-2012-0063748 | 6/2012 |
| KR | 10-2012-0118856 A | 10/2012 |
| KR | 10-2013-0015230 | 2/2013 |
| KR | 10-2013-0022649 | 3/2013 |
| KR | 10-2013-0103158 | 9/2013 |
| KR | 10-2013-0135153 A | 12/2013 |
| KR | 10-2014-0011809 | 1/2014 |
| KR | 10-2014-0026197 A | 3/2014 |
| KR | 10-2014-0058762 | 5/2014 |
| KR | 10-2015-0089788 | 8/2015 |

OTHER PUBLICATIONS

Park et al. (KR 10-2015-0089788 A) (Aug. 5, 2015) (KIPRIS machine translation to English).
Blaiszik, B.J. et al., "Self-Healing Polymers and Composites," Annual Review of Materials Research 2010, vol. 40, pp. 179-211 (35 pages).
Hastrich, Carl, "Bouncing Ideas, emerging design ideas of biomimicry, critical creativity, sustainability and strategic thinking, Self Healing Materials," Filed under: Materials Research, Posted: Feb. 1, 2012, http://bouncingideas.wordpress.com/2012/02/01/self-healing-materials/, 8 pages.
Toohey et al., "Self-healing materials with microvascular networks," Nature Materials, Jun. 10, 2007, pp. 1-5.
[NPL-1] "iTouch Stylus Pen series 2012 DM," HuntWave Industrial Co., Ltd. (Nov. 25, 2013); <http://www.huntwave.com/products/as801.html>.
U.S. Office Action dated Nov. 4, 2015, issued in U.S. Appl. No. 14/528,377 (16 pages).
U.S. Notice of Allowance dated Apr. 1, 2016, issued in U.S. Appl. No. 14/332,339 (9 pages).
U.S. Notice of Allowance dated Dec. 2, 2016, issued in U.S. Appl. No. 14/936,710 (8 pages).
U.S. Office Action dated Jun. 15, 2017, issued in U.S. Appl. No. 14/983,421 (13 pages).
U.S. Office Action dated Nov. 27, 2017, issued in U.S. Appl. No. 14/983,421 (12 pages).
U.S. Office Action dated Dec. 4, 2017, issued in U.S. Appl. No. 14/822,774 (16 pages).
Singh et al., "Indium Tin Oxide (ITO) films on flexible substrates for organic light emitting diodes," Proc. of ASID '06, Oct. 8-12, 2006, New Delhi, pp. 388-391.
Xiao et al, "Selective Patterning of ITO on flexible PET Substrate by 1064nm picosecond Laser," Physics Procedia 12 (2011), pp. 125-132, 2011.
U.S. Final Office Action dated Jun. 15, 2018, issued in U.S. Appl. No. 14/822,774, 20 pages.

* cited by examiner

FLEXIBLE WINDOW SUBSTRATE AND FLEXIBLE DISPLAY DEVICE HAVING THE SAME

CROSS-REFERENCE TO RELATED APPLICATION

This application claims priority to and the benefit of Korean Patent Application No. 10-2015-0015565 filed in the Korean Intellectual Property Office on Jan. 30, 2015, the entire contents of which are incorporated herein by reference.

BACKGROUND

1. Field

The described technology relates generally to a display device.

2. Description of the Related Art

A display device is a device which visually displays data. Generally, the display device, which is generally one of the output devices of a computer, is a device which enables a user to directly see results processed by the computer with his/her eyes by displaying the results on a screen. Types of display devices include cathode ray tubes (CRTs), liquid crystal displays (LCDs), organic light emitting diode displays (OLED displays), electrophoretic displays (EPDs), and the like. With recent developments in the field of display devices, display devices are currently not limited to a function as output devices of the computer but has been variously applied to an application field such as a television receiver, portable communication devices, wearable electronic devices, and the like.

Among the display devices, liquid crystal displays, organic light emitting diode displays, electrophoretic displays, and the like, which may be manufactured as a module having a flat panel shape, may have a large area, a thin profile, and reduced weight, and as a result, have taken the lead in the display industry. Further, a flexible display device, which may be bent, rolled, or stretched as a whole by external force by using a flexible or stretchable material as a material of a substrate, has been developed.

A touch screen panel has been developed to be able to use an input scheme which may replace input schemes such as a mouse and a keyboard so as to directly input information to a screen using a hand or a pen. Any user may directly perform his/her desired operation while viewing a screen of a the touch screen panel and easily operate the touch screen panel, and therefore the touch screen panel has been evaluated as the most ideal input scheme under a graphical user interface (GUI) environment and has been widely used in various fields such as a control screen of mobile phones, tablet computers, various kinds of medical equipment and an information display for guiding a bank, a government office, a tourist, and main institutions. The touch screen panel is used by being combined with a flat panel display, such as a liquid crystal display (LCD) and an organic light emitting diode (OLED) display, or a flexible display device.

Although the touch screen panel is applied to the flexible display device, a window layer positioned at an outermost side of the flexible display device has flexible characteristics, and therefore a surface thereof may be easily damaged due to a contact of a hand or a touch pen. When the window layer includes a rigid material to prevent the damage to the surface, the flexibility of the display device may be decreased.

The above information disclosed in this Background section is only for enhancement of understanding of the background of the described technology and therefore it may contain information that does not form prior art.

SUMMARY

According to embodiments of the present invention, a flexible display device has a flexible window substrate capable of being bent or expanded or contracted by external force.

The described technology provides a flexible display device capable of concurrently implementing flexibility and high hardness characteristics by forming a plurality of independently segmented coating layers from a high hardness material on a window substrate including a flexible material.

Further, embodiments of the present invention provide a flexible window substrate having a plurality of independently segmented coating layers with a high hardness material on a surface thereof to be applied to a flexible display device.

An exemplary embodiment of the present invention provides a flexible display device including a display panel configured to display an image, a touch screen panel on the display panel, and a window substrate covering the touch screen panel.

The window substrate may include: a flexible base layer including a first surface facing an outside and a second surface facing the display panel in an opposite direction to the first surface; a first coating layer having hardness higher than that of the base layer and having a plurality of first coating tiles arranged on the first surface of the base layer thereof, at a first gap from each other; and a second coating layer having hardness higher than that of the base layer and having a plurality of second coating tiles arranged on a layer different from the first surface of the base layer thereof, at a second gap from each other, wherein the first gap of the first coating layer at least partially overlaps one of the second coating tiles of the second coating layer.

The second coating layer may be on the second surface of the base layer.

The flexible display device may further include: a third coating layer between the first surface and the second surface of the base layer.

The third coating layer may include a plurality of third coating tiles which are arranged at a third gap from each other.

The third gap of the third coating layer may at least partially overlap one of the first coating tiles of the first coating layer or one of the second coating tiles of the second coating layer.

The third coating layer may be of a single body which is formed as one layer.

The second coating layer may be on a layer between the first surface and the second surface of the base layer.

The plurality of first coating tiles and second coating tiles may be isolated from each other.

The plurality of first coating tiles and the plurality of second coating tiles may be each formed in a matrix form.

A crossing point of lattice type patterns which are formed by the first gap may at least partially overlap one of the second coating tiles; and a crossing point of lattice type patterns which are by the second gap may at least partially overlap one of the first coating tiles.

The window substrate may be divided into a display area in which an image is displayed and a non-display area which surrounds the display area and the first coating layer may be at an area which corresponds to the display area.

The plurality of first coating tiles and the plurality of second coating tiles may have different plane shapes from each other.

The first coating tiles may have plane areas different from those of the second coating tiles.

A thickness of the first coating tiles or the second coating tiles may be between 10 μm an 100 μm.

When a curvature radius of a tip of a touch pen which is used by contacting a surface of the window substrate is set to be r, a thickness of the first coating tiles is set to be d, and a maximum gap between the first coating tiles adjacent to each other is set to be S, the maximum gap may satisfy $$S \leq 2\sqrt{d(2r-d)}$$

The gap between the first coating tiles adjacent to each other may be between 20 μm to 200 μm.

The first coating tiles and the second coating tiles may have a quadrangular plane shape.

The second coating tiles may each correspond to the plurality of first coating tiles.

The first coating tiles may have a quadrangular plane shape and the second coating tiles may have a hexagonal plane shape.

The second coating tiles may be arranged so that respective corners of three of the hexagonal coating tiles are adjacent to a point.

A crossing point of lattice type patterns which are formed by the first gap may at least partially overlap one of the second coating tiles; and at least some of the crossing points formed by the second gap may overlap one of the first coating tiles.

The base layer may include a material selected from the group consisting of elastomer, polyethylene terephthalate (PET), polyethylene naphthalate (PEN), polyimide (PI), polymethyl methacrylate (PMMA), silicone, polyurethane (PU), and combinations thereof.

The first coating tiles or the second coating tiles may include material selected from the group consisting of epoxy, acryl, silicone, polyurethane (PU), graphene, carbon nanotube (CNT), indium tin oxide (ITO), indium zinc oxide (IZO), Si, SiOx, SiNx, and combinations thereof.

As described above, according to the flexible display device of an exemplary embodiment, it is possible to concurrently implement flexibility and high hardness characteristics by forming the plurality of independently segmented coating layers with the high hardness material on the window substrate including the flexible material.

That is, it is possible to maintain the hardness of the surface at a high level while securing flexibility or stretchability of the window substrate by allowing the first coating layer on the outer surface of the window substrate to include the first coating tiles which are isolated from each other. Further, it is possible to reinforce the hardness of the first gap portion through which the base layer is exposed to the outside by allowing the second coating layer inside the window substrate to include the second coating coil arranged to partially overlap the first gap of the first coating layer.

Further, it is possible to improve the hardness of the window substrate by configuring the first coating tiles and the second coating tiles in the complementary form to each other even though the alignment of the coating tiles is not precisely controlled during the process and to improve the visibility by covering the gap between the coating tiles.

DETAILED DESCRIPTION

Figure 1:
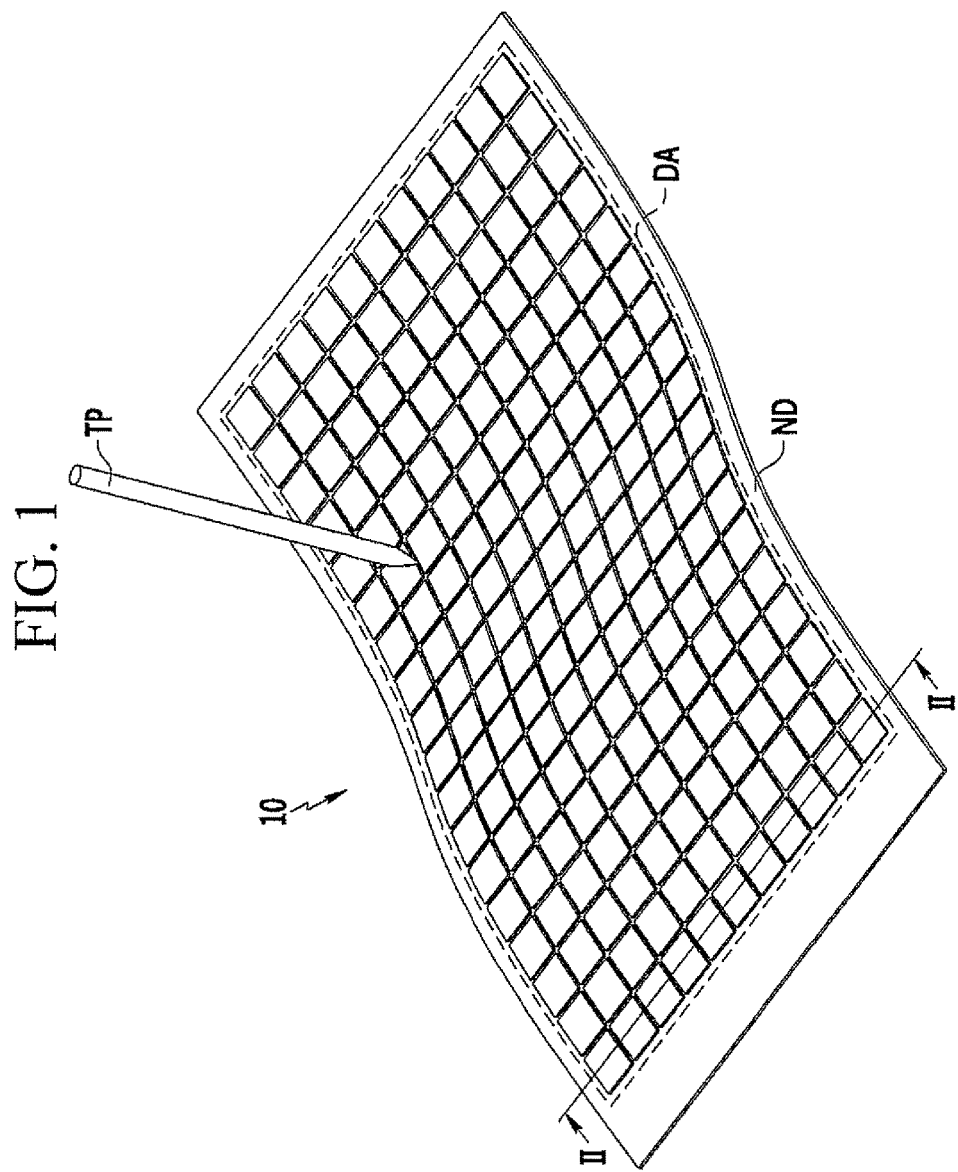
FIG. 1 is a perspective view illustrating a flexible display device according to an exemplary embodiment.

In the following detailed description, certain exemplary embodiments have been shown and described, simply by way of illustration. As those skilled in the art would realize, the described embodiments may be modified in various suitableways, all without departing from the spirit or scope of the present invention. The drawings and description are to be regarded as illustrative in nature and not restrictive. Like reference numerals designate like elements or components throughout the specification. In addition, the size and thickness of each configuration shown in the drawings are arbitrarily shown for understanding and ease of description, but the present invention is not limited thereto.

Further, in the specification, the word "on" means positioning on or below the object portion, but does not essentially mean positioning on the upper side of the object portion based on a gravity direction. In addition, unless explicitly described to the contrary, the word "comprise" and variations such as "comprises" or "comprising", will be understood to imply the inclusion of stated elements or components but not the exclusion of any other elements or components.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first", "second", "third", etc., may be used herein to describe various elements, components, regions, layers, and/or sections, these elements, components, regions, layers and/or sections should not be limited by these terms. These terms are only used to distinguish one element, component, region, layer or section from another element, component, region, layer or section. Thus, a first element, component, region, layer, or section discussed below could be termed a second element, component, region, layer, or section, without departing from the spirit and scope of the present invention.

Further, it will also be understood that when one element, component, region, layer and/or section is referred to as being "between" two elements, components, regions, layers, and/or sections, it can be the only element, component, region, layer and/or section between the two elements, components, regions, layers, and/or sections, or one or more intervening elements, components, regions, layers, and/or sections may also be present.

The terminology used herein is for the purpose of describing particular embodiments only and is not intended to be limiting of the present invention. As used herein, the singular forms "a" and "an" are intended to include the plural forms as well, unless the context clearly indicates otherwise.

As used herein, the term "substantially," "about," and similar terms are used as terms of approximation and not as terms of degree, and are intended to account for the inherent deviations in measured or calculated values that would be recognized by those of ordinary skill in the art.

As used herein, the terms "use," "using," and "used" may be considered synonymous with the terms "utilize," "utilizing," and "utilized," respectively.

Also, any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112, first paragraph, and 35 U.S.C. § 132(a).

As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration.

Hereinafter, a flexible display device according to an exemplary embodiment will be described in detail with the accompanying drawings.

FIG. 1 is a perspective view illustrating a flexible display device according to an exemplary embodiment.

Referring to FIG. 1, a flexible display device 10 according to an exemplary embodiment has a structure in which a display panel and a touch screen panel are protected by being covered with a window substrate 200, in which the window substrate 200 may be divided into a display area DA for displaying an image and a non-display area ND surrounding the display area DA, and having a driving circuit unit (or a driving circuit, a frame, and the like positioned thereon. The window substrate 200 includes a base layer 210 made of a flexible material and a coating layer 230 in which a plurality of coating tiles 231 are arranged on and attached to a surface toward an outside of the base layer 210 at a distance from each other.

For an input onto the display screen, a user may use a touch pen TP by making the touch pen TP contact a surface of the window substrate 200. Therefore, the coating layer 230 is formed by attaching a plurality of coating tiles 231 to the base layer 210 of the window substrate 200 corresponding to at least the display area DA, and the coating tile 231 is made of a material having hardness higher than that of the base layer 210.

Figure 2:
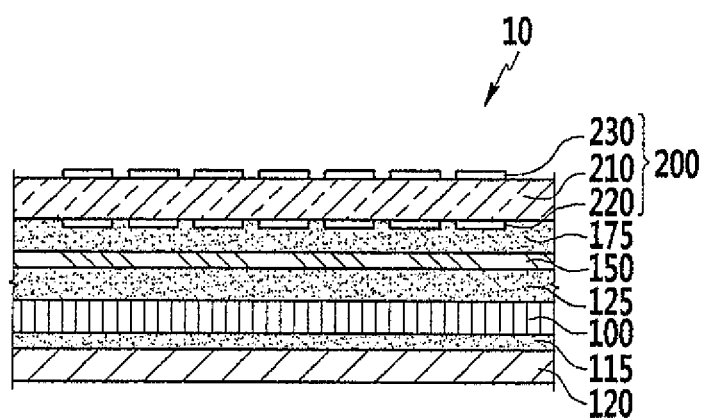
FIG. 2 is a partial cross-sectional view taken along the line II-II of FIG. 1.
Figure 3:
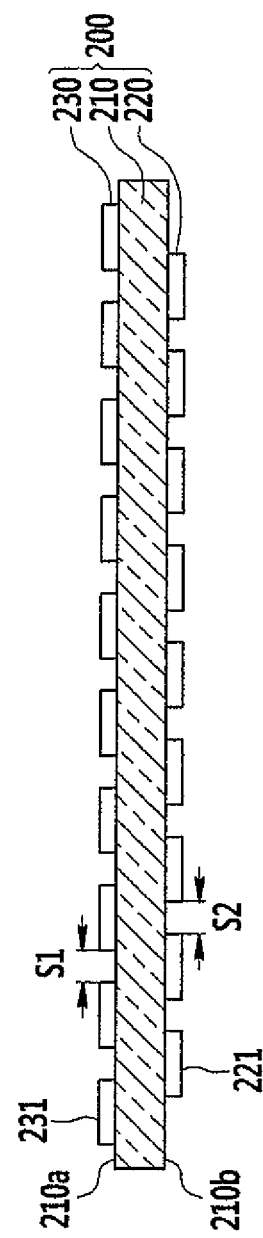
FIG. 3 is a cross-sectional view illustrating a window substrate of FIG. 2.

FIG. 2 is a partial cross-sectional view taken along the line II-II of FIG. 1 and FIG. 3 is a cross-sectional view illustrating a window substrate of FIG. 2.

A cross section configuration of the flexible display device 10 according to an exemplary embodiment will be described in more detail from FIG. 2, which illustrates that a touch screen panel 150 is attached to an upper portion of the display panel 100 and the window substrate 200 is attached to an upper portion of the touch screen panel 150 to cover the display panel 100 and the touch screen panel 150.

The display panel 100 includes a plurality of pixels which are arranged in a matrix form to display an image, and may be configured of an organic light emitting panel according to an exemplary embodiment. The display panel 100 may be formed on a flexible substrate to have flexible characteristics, and therefore, may be configured of a curved panel or a bendable, foldable, rollable, or stretchable panel.

A lower protective film 120 is provided under the display panel 100 to protect the display panel 100. The lower protective film 120 may be formed of a flexible plastic film, for example, polyimide (PI) and/or polyethylene terephthalate (PET). A display panel adhesive layer 115 may be interposed between the lower protective film 120 and the display panel 100 to attach the display panel 100 to the lower protective film 120. The display panel adhesive layer 115 may be made of an optically clear adhesive (OCA) and may be applied in an adhesive tape form or may also be applied by applying and hardening an adhesive material.

An optical film may be attached on the display panel 100. As another example, the optical film may also be positioned on the touch screen panel 150. The optical film may include a polarization film and a phase difference film, in which the polarization film may polarize light incident on the display panel and light obtained by reflecting the incident light from the display panel, and the phase difference film may be adjacently disposed on the display panel rather than on the polarization film to control a phase of the incident light and the reflected light.

The touch screen panel 150 is attached over the display panel 100. When the optical film is attached on the display panel 100, the touch screen panel 150 is positioned over the optical film, and a TSP adhesive layer 125 may be interposed between the display panel 100 and the touch screen panel 150 to attach the touch screen panel 150 to the display panel 100. The TSP adhesive layer 125 may be made of an optically clear adhesive (OCA) and may be applied in an adhesive tape form or may also be applied by applying and hardening an adhesive material.

The touch screen panel 150 may sense a touch position input from the outside, and the window substrate 200 may be positioned over the touch screen panel 150 to sense the touch position generated from the window substrate 200. According to an exemplary embodiment, the touch screen panel 150 may be formed of a panel which is driven with a capacitive type but the present invention is not limited thereto, and therefore the touch screen panel 150 may also be formed of a panel which is driven with a resistive film type, an ultrasonic type, and/or an infrared type.

The window substrate 200 is formed to have an area larger than that of the display panel 100 and the touch screen panel 150 to cover the display panel 100 and the touch screen panel 150. The window adhesive layer 175 is interposed between the touch screen panel 150 and the window substrate 200 to attach the window substrate 200 to the touch screen panel 150. The window adhesive layer 175 may be made of an optically clear adhesive (OCA) and may be applied in an adhesive tape form or may also be applied by applying and hardening an adhesive material.

Referring to FIG. 3, the window substrate 200 according to an exemplary embodiment includes the flexible base layer 210 having a first surface 210a facing the outside and a second surface 210b facing the display panel 100 in an opposite direction thereto and the first coating layer 230 in which the plurality of first coating tiles 231 are arranged on and attached to the first surface 210a of the base layer 210 at a first gap s1 from each other. The second coating layer 220 in which a plurality of second coating tiles 221 are arranged on and attached to the second surface 210b of the base layer 210 at a second gap s2 from each other is formed. The first gap s1 of the first coating layer 230 may be disposed to at least partially overlap the second coating tile 221 of the second coating layer 220.

The first coating tile 231 and the second coating tile 221 may be made of a material having hardness higher than that of the base layer 210 and may be made of different materials. For example, the base layer 210 may be made of a material selected from the group consisting of elastomer, polyethylene terephthalate (PET), polyethylene naphthalate (PEN), polyimide (PI), polymethyl methacrylate (PMMA), silicone, polyurethane (PU), and combinations thereof. The first coating tile 231 and the second coating tile 221 may be made of a material selected from the group consisting of epoxy, acryl, silicone, polyurethane (PU), graphene, carbon nanotube (CNT), indium tin oxide (ITO), indium zinc oxide (IZO), Si, SiOx, SiNx, and combinations thereof.

As such, the first coating layer 230 includes the first coating tiles 231 which are formed to be isolated from each other to maintain the hardness of the surface at a high level while securing the flexibility or stretchability of the window substrate 200. Further, the second coating layer 220 includes the second coating tile 221 which is disposed to partially overlap the first gap s1 of the first coating layer 230 to serve to reinforce the hardness of a portion of the first gap s1 through which the base layer 210 is exposed to the outside.

Further, the first coating tile 231 and the second coating tile 221 may be configured to complement each other even though the alignment of the coating tiles is not precisely controlled during the process to promote the hardness of the window substrate and the gap between the coating tiles s1 covered to improve visibility.

Figure 4:
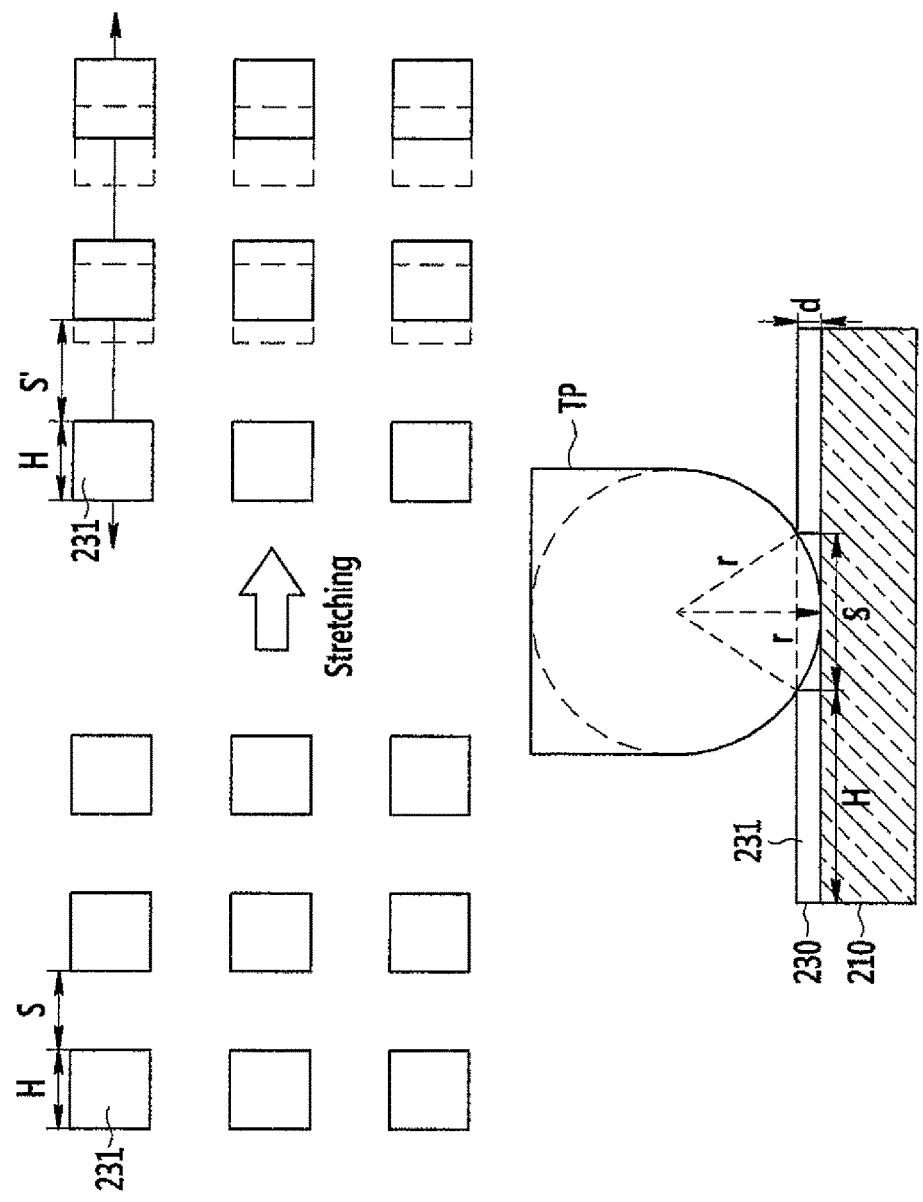
FIG. 4 is a diagram for describing a gap design condition of a coating tile formed on the window substrate of the flexible display device according to an exemplary embodiment.

FIG. 4 is a diagram for describing a gap design condition of a coating tile formed on the window substrate of the flexible display device according to an exemplary embodiment.

Referring to FIG. 4, when a curvature radius of a tip of a touch pen TP which is used by contacting the surface of the window substrate 200 according to an exemplary embodiment is set to be r, the thickness of the first coating tile 231 formed on the first coating layer 230 of the window substrate 200 is d, and the maximum gap between the first coating tiles 231 adjacent to each other is set to be S, the maximum gap S may be formed to satisfy the following Equation 1.

$$S \leq 2\sqrt{d(2r-d)} \qquad \text{Equation 1}$$

The gap design process of the first coating tile 231 will be described based on the above Equation 1.

First, when the thickness d of the first coating tile 231 is set to be 10 μm, the maximum gap S depending on the curvature radius r of the tip of the touch pen TP is shown in the following Table 1.

TABLE 1

| | Curvature radius r of tip of touch pen [mm] | Maximum gap (S) [μm] |
|---|---|---|
| Thickness of coating tile d = 10 μm | 0.01 | 20 |
| | 0.05 | 60 |
| | 0.1 | 87.2 |
| | 0.5 | 199.0 |
| | 0.7 | 235.8 |
| | 1.0 | 282.1 |

Next, if it is assumed that an elongation of the window substrate 200 is 30% and 100%, the following Table 2 shows a pitch of the first coating tiles 231, a width H of the coating tile 231, and gaps S and S' between the first coating tiles 231 before the window substrate 200 is stretched, after the window substrate 200 is stretched by 30%, and the window substrate 200 is stretched by 100%. The pitch of the first coating tile 231 may be obtained by a summed value of the width H and the gaps S and S' and the maximum gap before the window substrate 200 is stretched is set to be S and the maximum gap after the window substrate 200 is stretched is set to be S'. Further, it is assumed that the width H and the maximum gap S of the first coating tile 231 before the window substrate 200 is stretched are designed to be the same or substantially the same as each other.

TABLE 2

| Before being stretched | | | After being stretched by 30% | | | After being stretched by 100% | | |
|---|---|---|---|---|---|---|---|---|
| Pitch [μm] | Width (H) [μm] | Gap (S) [μm] | Pitch [μm] | Width (H) [μm] | Gap (S') [μm] | Pitch [μm] | Width (H) [μm] | Gap (S') [μm] |
| 350 | 175 | 175 | 455 | 175 | 280 | 700 | 175 | 525 |
| 300 | 150 | 150 | 390 | 150 | 240 | 600 | 150 | 450 |
| 250 | 125 | 125 | 325 | 125 | 200 | 500 | 125 | 375 |
| 200 | 100 | 100 | 260 | 100 | 160 | 400 | 100 | 300 |
| 150 | 75 | 75 | 195 | 75 | 120 | 300 | 75 | 225 |
| 100 | 50 | 50 | 130 | 50 | 80 | 200 | 50 | 150 |
| 50 | 25 | 25 | 65 | 25 | 40 | 100 | 25 | 75 |
| 10 | 5 | 5 | 13 | 5 | 8 | 20 | 5 | 15 |
| 5 | 2.5 | 2.5 | 6.5 | 2.5 | 4 | 10 | 2.5 | 7.5 |
| 1 | 0.5 | 0.5 | 1.3 | 0.5 | 0.8 | 2 | 0.5 | 1.5 |
| 0.5 | 0.25 | 0.25 | 0.65 | 0.25 | 0.4 | 1 | 0.25 | 0.75 |
| 0.1 | 0.05 | 0.05 | 0.13 | 0.05 | 0.08 | 0.2 | 0.05 | 0.15 |

For example, when the curvature radius r of the tip of the touch pen TP is set to be 0.5 mm and the thickness d of the first coating tile 231 is 10 μm, referring to Table 1, the allowable maximum gap S may be appreciated to be about 199 μm. Referring to Table 2, the case in which the maximum gap S' is set to be 200 μm when the window substrate 200 is stretched by 30% is the maximum allowable value and the case in which the gap S' is 150 μm when the window substrate 200 is stretched by 100% is the maximum allowable value.

Therefore, when the elongation of the window substrate 200 is 30%, the width H and the maximum gap S of the first coating tile 231 may be each set to be up to 125 μm, and when the elongation of the window substrate 200 is 100%, the width H and the maximum gap S of the first coating tile 231 may be each set to be up to 50 μm.

However, the above-mentioned design values are suggested for an exemplary description and therefore the range of values in the present invention is not limited thereto.

Figure 5:
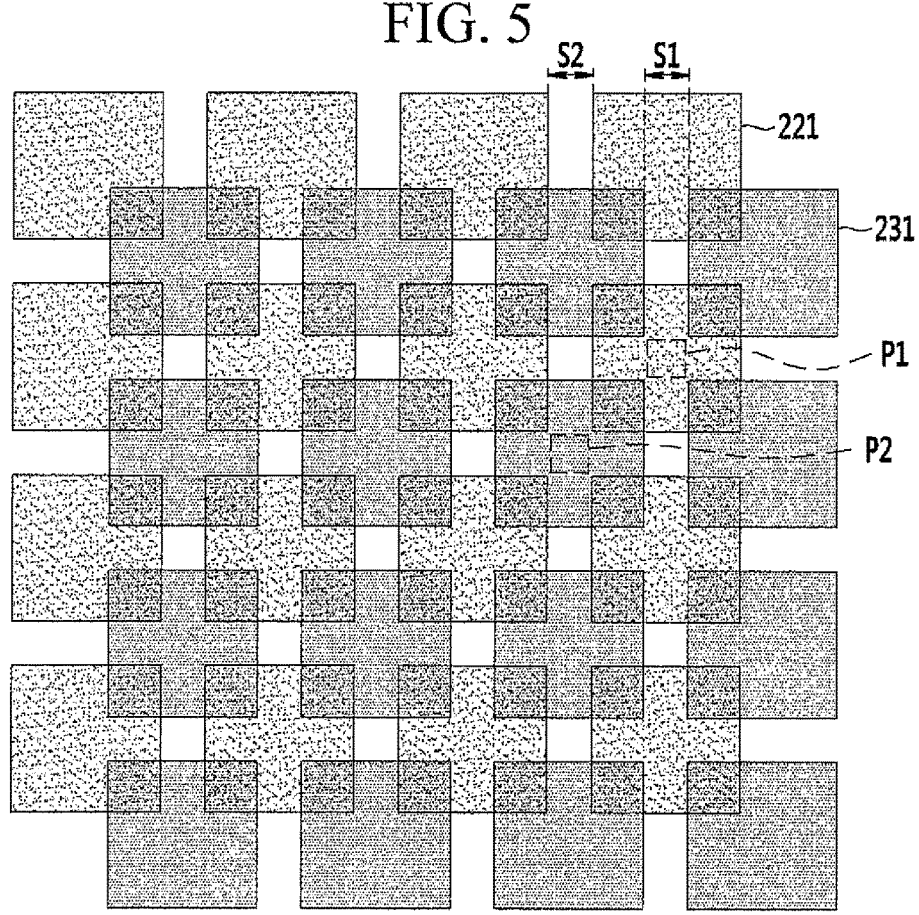
FIG. 5 is a plan view illustrating a coating layer pattern formed on the window substrate of the flexible display device according to an exemplary embodiment.

FIG. 5 is a plan view illustrating a coating layer pattern formed on the window substrate of the flexible display device according to an exemplary embodiment.

In the first coating layer 230 configuring the window substrate 200 of the flexible display device 10 according to an exemplary embodiment, the plurality of first coating tiles 231 are each formed to be isolated from each other while having the same or substantially the same plane shape and are attached to the first surface 210a of the base layer 210 while being arranged in a matrix form. In the second coating layer 220, the plurality of second coating tiles 221 are each formed to be isolated from each other while having the same or substantially the same plane shape, and are attached to the second surface 210b of the base layer 210 while being arranged in the matrix form.

Referring to FIG. 5, according to an exemplary embodiment, the first coating tile 231 and the second coating tile 221 each have a square plane shape and the first gap s1 formed between the first coating tiles 231 adjacent to each other and the second gaps s2 formed between the second coating tiles 221 adjacent to each other are arranged to have a uniform gap in all directions on a plane.

A crossing point s1 of a lattice type pattern which is formed by the first gap s1 is disposed to overlap the second coating tile 221 and a crossing point p2 of the lattice type pattern formed by the second gap s2 is disposed to overlap the first coating tile 231. Therefore, the first gap s1 of the first coating layer 230 partially overlaps the second coating tile 221 of the second coating layer 220, and the second gap s2 of the second coating layer 220 partially overlaps the first coating tile 231 of the first coating layer 230.

The number and each area of coating tiles 231 and 221 which are included in the first coating layer 230 and the second coating layer 220, respectively, may be determined and selected depending on the size of the display device and the designed flexibility. Each of the coating tiles 231 and 221 may be formed at a size to which at least one pixel corresponds, formed to have the same or substantially the same area for each layer, or formed to have the same or substantially the same area in all the layers.

Figure 6:
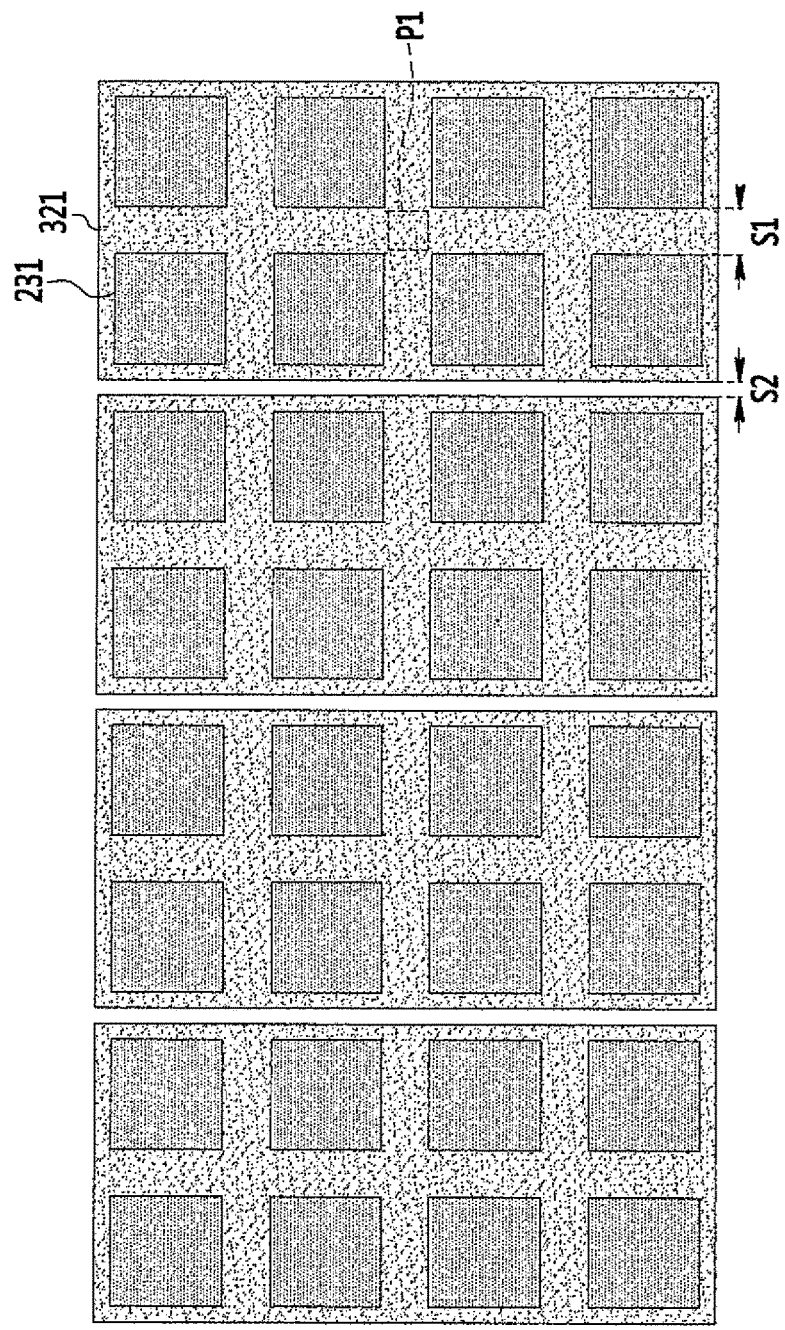
FIG. 6 is a plan view illustrating a coating layer pattern formed on a window substrate of a flexible display device according to another exemplary embodiment.

FIG. 6 is a plan view illustrating a coating layer pattern formed on a window substrate of a flexible display device according to another exemplary embodiment.

Referring to FIG. 6, the first coating layer formed on the first surface facing the outside of the window substrate according to an exemplary embodiment includes the first coating tile 231 having a square plane shape. Further, the second coating layer formed on the second surface of the window substrate facing the display panel (see FIG. 2) includes the second coating tile 321 having a rectangular plane shape and the second coating tile 321 is formed to have an area corresponding to the plurality of first coating tiles 231. For example, as illustrated in FIG. 6, eight first coating tiles 231 may correspond to one second coating tile 321.

According to an exemplary embodiment, the first gap s1 formed between the first coating tiles 231 adjacent to each other and the second gap s2 formed between the second coating tiles 321 adjacent to each other may be arranged to have a uniform gap in all directions on a plane.

A portion of the crossing point p1 of the lattice type pattern which is formed by the first gap s1 is disposed to overlap the second coating tile 321. Therefore, the first gap s1 partially overlaps the second coating tile 321 of the second coating layer. However, when the first coating tiles 231 of the first coating layer are arranged to be included in the second coating tile 321 region of the second coating layer, the second gap s2 of the second coating layer may not overlap the first coating tile 231.

Figure 7:
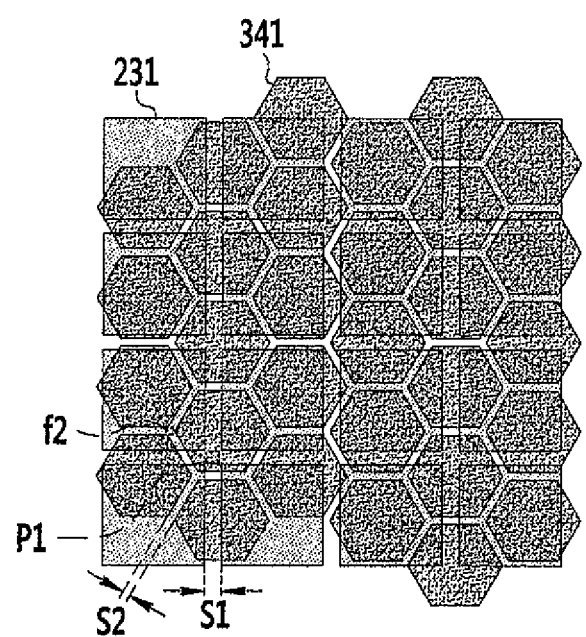
FIG. 7 is a plan view illustrating a coating layer pattern formed on a window substrate of a flexible display device according to still another exemplary embodiment.

FIG. 7 is a plan view illustrating a coating layer pattern formed on a window substrate of a flexible display device according to still another exemplary embodiment, Referring to FIG. 7, the first coating layer formed on the first surface facing the outside of the window substrate according to an exemplary embodiment includes the first coating tile 231 having a quadrangular plane shape. Further, the second coating layer which is formed on the second surface of the window substrate facing the display panel (see FIG. 2) includes a second coating tile 341 having a hexagonal plane shape. Corners of each of the second coating tiles 341 having three hexagonal shapes may be disposed to be adjacent to one point (crossing point).

According to an exemplary embodiment, the first gap s1 formed between the first coating tiles 231 adjacent to each other may be arranged to have a uniform gap in all directions on a plane and the second gap s2 between adjacent sides of each of the second coating tiles 341 adjacent to each other may be uniformly formed over the whole of the second coating layer.

A portion of the crossing point p1 of the lattice type pattern which is formed by the first gap s1 is disposed to overlap the second coating tile 341 and a portion of a crossing point f2 of the pattern formed by the second gap s2 is disposed to overlap the first coating tile 231. Therefore, the first gap s1 of the first coating layer partially overlaps the second coating tile 341 of the second coating layer and the second gap s2 of the second coating layer partially overlaps the first coating tile 231 of the first coating layer.

Figure 8:
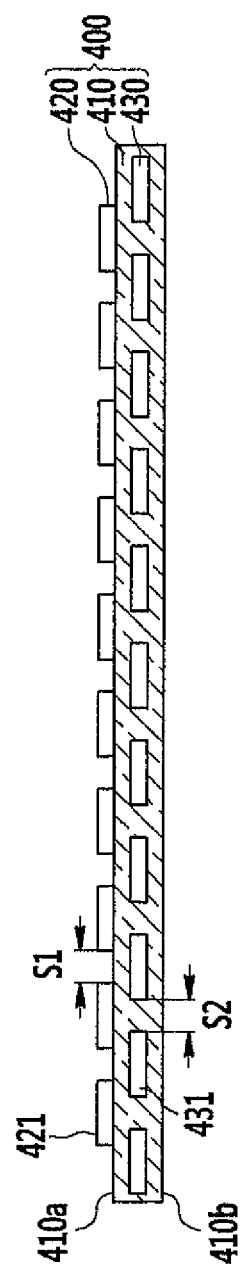
FIG. 8 is a cross-sectional view illustrating the coating layer pattern formed on the window substrate of the flexible display device according to still another exemplary embodiment.

FIG. 8 is a cross-sectional view illustrating the coating layer pattern formed on the window substrate of the flexible display device according to still another exemplary embodiment.

Referring to FIG. 8, a window substrate 400 according to an exemplary embodiment includes the flexible base layer 410 having a first surface 410a facing the outside and a second surface 410b facing the display panel (see FIG. 2) in an opposite direction thereto, and the first coating layer 420 in which the plurality of first coating tiles 421 are arranged on and attached to the first surface 410a of the base layer 410 at the first gap s1 from each other. The second coating layer 430 in which the plurality of second coating tiles 431 are arranged at the second gap s2 is formed on the layer between the first surface 410a and the second surface 410b of the base layer 410. That is, the second coating layer 430 may be positioned inside the base layer 410. The first gap s1 of the first coating layer 420 may be disposed to at least partially overlap the second coating tile 431 of the second coating layer 430.

The first coating tile 421 and the second coating tile 431 may be made of a material having hardness higher than that of the base layer 410 and may be made of different materials. For example, the base layer 410 may be made of a material selected from the group consisting of elastomer, polyethylene terephthalate (PET), polyethylene naphthalate (PEN), polyimide (PI), polymethyl methacrylate (PMMA), silicone, polyurethane (PU), and combinations thereof. The first coating tile 421 and the second coating tile 431 may be made of a material selected from the group consisting of epoxy, acryl, silicone, polyurethane (PU), graphene, carbon nanotube (CNT), indium tin oxide (ITO), indium zinc oxide (IZO), Si, SiOx, SiNx, and combinations thereof.

Figure 9:
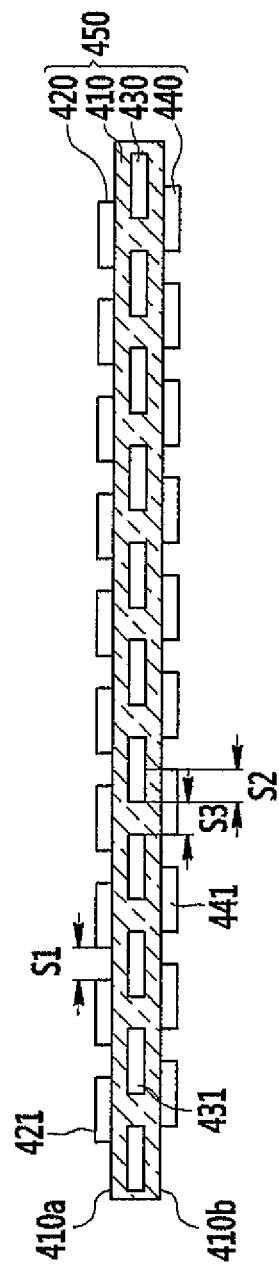
FIG. 9 is a cross-sectional view illustrating the coating layer pattern formed on the window substrate of the flexible display device according to still another exemplary embodiment.

FIG. 9 is a cross-sectional view illustrating the coating layer pattern formed on the window substrate of the flexible display device according to still another exemplary embodiment.

Referring to FIG. 9, a window substrate 450 according to an exemplary embodiment includes the flexible base layer 410 having a first surface 410a facing the outside and a second surface 410b facing the display panel (see FIG. 2) in an opposite direction thereto, and the first coating layer 420 in which the plurality of first coating tiles 421 are arranged on and attached to the first surface 410a of the base layer 410 at the first gap s1 from each other. The second coating layer 440 in which the plurality of second coating tiles 441 are arranged at and attached to the second gap s2 from each other is formed on the second surface 410b of the base layer 410, and the third coating layer 430 in which the plurality of third coating tiles 431 are arranged at a third gap s3 is formed on a layer between the first surface 410a and the second surface 410b of the base layer 410. That is, the third coating layer 430 may be positioned inside the base layer 410. The first gap s1 of the first coating layer 420 may be disposed to at least partially overlap the second coating tile 441 of the second coating layer 440 or the third coating tile 431 of the third coating layer 430.

The first coating tile 421, the second coating tile 441, and the third coating tile 431 may be made of a material having hardness higher than that of the base layer 410 and may be made of different materials. For example, the base layer 410 may be made of a material selected from the group consisting of elastomer, polyethylene terephthalate (PET), polyethylene naphthalate (PEN), polyimide (PI), polymethyl methacrylate (PMMA), silicone, polyurethane (PU), and combinations thereof. The first coating tile 421, the second coating tile 441, and the third coating tile 431 may be made of a material selected from the group consisting of epoxy, acryl, silicone, polyurethane (PU), graphene, carbon nanotube (CNT), indium tin oxide (ITO), indium zinc oxide (IZO), Si, SiOx, SiNx, and combinations thereof.

Figure 10:
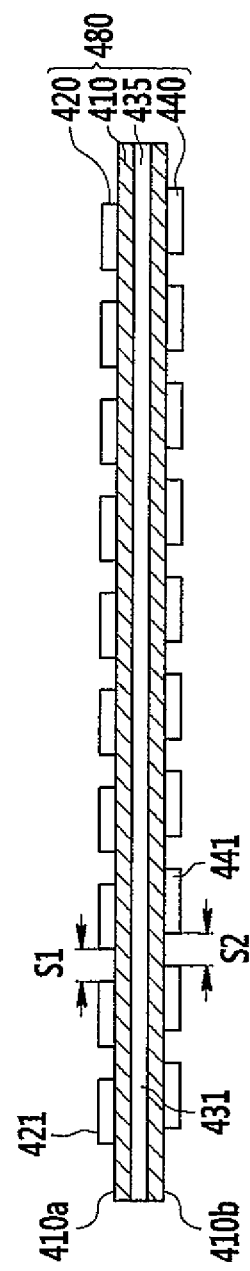
FIG. 10 is a cross-sectional view illustrating the coating layer pattern formed on the window substrate of the flexible display device according to still another exemplary embodiment.

FIG. 10 is a cross-sectional view illustrating the coating layer pattern formed on the window substrate of the flexible display device according to still another exemplary embodiment.

Referring to FIG. 10, a window substrate 480 according to an exemplary embodiment includes the flexible base layer 410 having a first surface 410a facing the outside and a second surface 410b facing the display panel (see FIG. 2) in an opposite direction thereto, and the first coating layer 420 in which the plurality of first coating tiles 421 are arranged on and attached to the first surface 410a of the base layer 410 at the first gap s1 from each other. The second coating layer 440 in which the plurality of second coating tiles 441 are arranged at and attached to the second gap s2 from each other is formed on the second surface 410b of the base layer 410, and a third coating layer 435 having a single layer structure is formed on a layer between the first surface 410a and the second surface 410b of the base layer 410. That is, the third coating layer 435 may be positioned inside the base layer 410 and may be formed as a single body in which the whole of the third coating layer 435 is connected as one layer. The first gap s1 of the first coating layer 420 may be disposed to at least partially overlap the second coating tile 441 of the second coating layer 440.

The first coating tile 421, the second coating tile 441, and the third coating layer 435 may be made of a material having hardness higher than that of the base layer 410 and may be made of different materials. For example, the base layer 410 may be made of a material selected from the group consisting of elastomer, polyethylene terephthalate (PET), polyethylene naphthalate (PEN), polyimide (PI), polymethyl methacrylate (PMMA), silicone, polyurethane (PU), and combinations thereof. The first coating tile 421, the second coating tile 441, and the third coating layer 435 may be made of a material selected from the group consisting of epoxy, acryl, silicone, polyurethane (PU), graphene, carbon nanotube (CNT), indium tin oxide (ITO), indium zinc oxide (IZO), Si, SiOx, SiNx, and combinations thereof.

While this disclosure has been described in connection with what is presently considered to be practical exemplary embodiments, it is to be understood that the invention is not

DESCRIPTION OF SOME OF THE REFERENCE CHARACTERS

10: Flexible display device   100: Display panel
115: Display panel adhesive layer 120: Lower protective film
125: TSP adhesive layer          150: Touch screen panel
175: Window adhesive layer       200, 400, 450, 480: Window substrate
210, 410: Base layer             220, 430, 440: Second coating layer
221, 321, 341, 441: Second coating tile   230, 420: First coating layer
231, 421: First coating tile

What is claimed is:

1. A flexible display device comprising:
a display panel configured to display an image;
a window substrate covering the display panel,
wherein the window substrate comprises:
a flexible base layer comprising:
a first surface facing an outside; and
a second surface facing the display panel in an opposite direction to the first surface;
a first coating layer having hardness higher than that of the base layer and comprising a plurality of first coating tiles arranged on the first surface of the base layer thereof, at a first gap from each other; and
a second coating layer having hardness higher than that of the base layer and comprising a plurality of second coating tiles arranged on a layer different from the first surface of the base layer thereof, at a second gap from each other, and
wherein the first gap of the first coating layer at least partially overlaps one of the second coating tiles of the second coating layer.

2. The flexible display device of claim 1,
wherein the second coating layer is on the second surface of the base layer.

3. The flexible display device of claim 1,
wherein the second coating layer is on a layer between the first surface and the second surface of the base layer.

4. The flexible display device of claim 1,
wherein the plurality of first coating tiles and the plurality of second coating tiles are isolated from each other.

5. The flexible display device of claim 1,
wherein the plurality of first coating tiles and the plurality of second coating tiles are each formed in a matrix form.

6. The flexible display device of claim 5,
wherein a crossing point of lattice type patterns which are formed by the first gap at least partially overlaps one of the second coating tiles; and
wherein a crossing point of lattice type patterns which are formed by the second gap at least partially overlaps one of the first coating tiles.

7. The flexible display device of claim 1,
wherein the window substrate is divided into a display area in which an image is displayed and a non-display area which surrounds the display area, and
wherein the first coating layer is at an area which corresponds to the display area.

8. The flexible display device of claim 1,
wherein the plurality of first coating tiles and the plurality of second coating tiles have different plane shapes from each other.

9. The flexible display device of claim 1,
wherein the first coating tiles each have plane areas different from those of the second coating tiles, respectively.

10. The flexible display device of claim 1,
wherein a thickness of the first coating tiles or the second coating tiles is between 10 µm and 100 µm.

11. The flexible display device of claim 1,
wherein when:
a curvature radius of a tip of a touch pen which is used by contacting a surface of the window substrate is set to be r, and
a thickness of the first coating tiles is set to be d and a maximum gap between the first coating tiles adjacent to each other is set to be S,
the maximum gap satisfies
$$S \leq 2\sqrt{d(2r-d)}.$$

12. The flexible display device of claim 1,
wherein the gap between the first coating tiles adjacent to each other is between 20 µm and 200 µm.

13. The flexible display device of claim 1,
wherein the first coating tiles and the second coating tiles have a quadrangular plane shape.

14. The flexible display device of claim 13,
wherein the second coating tiles each correspond to the plurality of first coating tiles.

15. The flexible display device of claim 1,
wherein the first coating tiles have a quadrangular plane shape and the second coating tiles have a hexagonal plane shape.

16. The flexible display device of claim 15,
wherein the second coating tiles are arranged so that respective corners of three of the hexagonal coating tiles are adjacent to a point.

17. The flexible display device of claim 16,
wherein a crossing point of lattice type patterns which are formed by the first gap at least partially overlaps one of the second coating tiles, and
wherein at least some of the crossing points formed by the second gap overlap one of the first coating tiles.

18. The flexible display device of claim 1,
wherein the base layer comprises a material selected from the group consisting of elastomer, polyethylene terephthalate (PET), polyethylene naphthalate (PEN), polyimide (PI), polymethyl methacrylate (PMMA), silicone, polyurethane (PU), and combinations thereof.

19. The flexible display device of claim 1,
wherein the first coating tiles or the second coating tiles comprises a material selected from the group consisting of epoxy, acryl, silicone, polyurethane (PU), graphene, carbon nanotube (CNT), indium tin oxide (ITO), indium zinc oxide (IZO), Si, SiOx, SiNx, and combinations thereof.

20. The flexible display device of claim 1, wherein the flexible display device senses a touch from an outside.

21. A flexible display device comprising:
a display panel configured to display an image; and
a window substrate covering the display panel,
wherein the window substrate comprises:
a flexible base layer comprising:
a first surface facing an outside; and
a second surface facing the display panel in an opposite direction to the first surface;
a first coating layer having hardness higher than that of the base layer and comprising a plurality of first coating tiles arranged on the first surface of the base layer thereof, at a first gap from each other;
a second coating layer having hardness higher than that of the base layer and comprising a plurality of second coating tiles arranged on a layer different from the first surface of the base layer thereof, at a second gap from each other; and
a third coating layer between the first surface and the second surface of the base layer,
wherein the second coating layer is on the second surface of the base layer, and
wherein the first gap of the first coating layer at least partially overlaps one of the second coating tiles of the second coating layer.

22. The flexible display device of claim 21,
wherein the third coating layer comprises a plurality of third coating tiles which are arranged at a third gap from each other.

23. The flexible display device of claim 22,
wherein the third gap of the third coating layer at least partially overlaps one of the first coating tiles of the first coating layer or one of the second coating tiles of the second coating layer.

24. The flexible display device of claim 21,
wherein the third coating layer is of a single body which is formed as one layer.

25. The flexible display device of claim 21, wherein the flexible display device senses a touch from an outside.

26. A flexible window substrata comprising:
a flexible base layer comprising:
a first surface facing an outside; and
a second surface facing a display panel in an opposite direction to the first surface;
a first coating layer having hardness higher than that of the base layer and comprising a plurality of first coating tiles arranged on the first surface of the base layer thereof, at a first gap from each other; and
a second coating layer having hardness higher than that of the base layer and comprising a plurality of second coating tiles arranged on a layer different from the first surface of the base layer thereof, at a second gap from each other,
wherein the first gap of the first coating layer at least partially overlaps one of the second coating tiles of the second coating layer,
wherein the plurality of first coating tiles are electrically isolated from each other, and
wherein the plurality of second coating tiles are electrically isolated from each other.

27. The flexible window substrate of claim 26,
wherein the second coating layer is on the second surface of the base layer.

28. The flexible window substrate of claim 27, further comprising:
a third coating layer on a layer between the first surface and the second surface of the base layer.

29. The flexible window substrate of claim 28,
wherein the third coating layer comprises a plurality of third coating tiles which are arranged at a third gap from each other.

30. The flexible window substrate of claim 29,
wherein the third gap of the third coating layer at least partially overlaps one of the first coating tiles of the first coating layer or one of the second coating tiles of the second coating layer.

31. The flexible window substrate of claim 26,
wherein the second coating layer is between the first surface and the second surface of the base layer.

32. The flexible window substrate of claim 26,
wherein the plurality of first coating tiles and the plurality of second coating tiles are each in a matrix form.

33. The flexible window substrate of claim 32,
wherein a crossing point of lattice type patterns which are by the first gap at least partially overlaps one of the second coating tiles; and
wherein a crossing point of lattice type patterns which are by the second gap at least partially overlaps one of the first coating tiles.

34. The flexible window substrate of claim 26,
wherein the plurality of first coating tiles and the plurality of second coating tiles have different plane shapes from each other.

35. The flexible window substrate of claim 26,
wherein the base layer comprises a material selected from the group consisting of elastomer, polyethylene terephthalate (PET), polyethylene naphthalate (PEN), polyimide (PI), polymethyl methacrylate (PMMA), silicone, polyurethane (PU), and combinations thereof.

36. The flexible window substrate of claim 26,
wherein the first coating tiles or the second coating tiles comprises a material selected from the group consisting of epoxy, acryl, silicone, polyurethane (PU), graphene, carbon nanotube (CNT), indium tin oxide (ITO), indium zinc oxide (IZO), Si, SiOx, SiNx, and combinations thereof.

* * * * *